United States Patent
Wang et al.

[11] Patent Number: 6,085,732
[45] Date of Patent: Jul. 11, 2000

[54] EGR FAULT DIAGNOSTIC SYSTEM

[76] Inventors: Yue Yun Wang, 1512 Hunter Pl., Columbus, Ind. 47203; Steven W. Majors, 7459 Southern Lakes Dr., Indianapolis, Ind. 46237

[21] Appl. No.: 09/237,103

[22] Filed: Jan. 25, 1999

[51] Int. Cl.$^7$ ................................................ F02M 25/07
[52] U.S. Cl. ............................. 123/568.12; 123/568.16; 73/117.3; 701/108
[58] Field of Search ..................... 123/568.12, 568.16; 701/108; 73/117.3

[56] References Cited

U.S. PATENT DOCUMENTS

| | | |
|---|---|---|
| 4,149,408 | 4/1979 | Ezoe et al. . |
| 4,164,206 | 8/1979 | Toelle . |
| 4,267,812 | 5/1981 | Aula et al. . |
| 4,394,742 | 7/1983 | Crummer et al. . |
| 4,424,709 | 1/1984 | Meier, Jr. et al. . |
| 4,462,376 | 7/1984 | Ripper et al. . |
| 4,715,348 | 12/1987 | Kobayashi et al. . |
| 4,793,318 | 12/1988 | Tsurusaki ................................. 701/108 |
| 4,834,054 | 5/1989 | Hashimoto et al. . |
| 4,870,941 | 10/1989 | Hisatomi . |
| 4,870,942 | 10/1989 | Shibata et al. . |
| 4,967,717 | 11/1990 | Miyazaki et al. . |
| 4,974,572 | 12/1990 | Aramaki . |
| 5,014,203 | 5/1991 | Miyazaki et al. ................... 123/568.16 |
| 5,041,976 | 8/1991 | Marko et al. . |
| 5,086,745 | 2/1992 | Nishimura et al. ...................... 701/108 |
| 5,103,655 | 4/1992 | Kano et al. . |
| 5,137,004 | 8/1992 | Takahata et al. . |
| 5,209,212 | 5/1993 | Viess et al. ......................... 123/568.16 |
| 5,243,949 | 9/1993 | Osawa . |
| 5,297,047 | 3/1994 | Matsuno . |
| 5,301,126 | 4/1994 | Nishimura et al. ...................... 701/108 |
| 5,387,253 | 2/1995 | Remboski, Jr. et al. . |
| 5,394,744 | 3/1995 | James et al. . |
| 5,508,926 | 4/1996 | Wade . |
| 5,621,167 | 4/1997 | Fang-Cheng . |
| 5,635,633 | 6/1997 | Kadota ................................ 123/568.16 |
| 5,703,285 | 12/1997 | Shimizu et al. . |
| 5,727,533 | 3/1998 | Bidner et al. . |
| 5,732,688 | 3/1998 | Charlton et al. .................... 123/568.12 |
| 5,916,130 | 6/1999 | Nakae et al. ........................ 123/568.16 |
| 6,009,709 | 1/2000 | Bailey ................................ 123/568.12 |

*Primary Examiner*—Willis R. Wolfe

[57] ABSTRACT

A system and method for diagnosing EGR system and EGR cooler faults evaluates a temperature signal generated by a sensor at the EGR cooler, such as a coolant or gas temperature sensor. An engine control module includes an on-board EGR diagnosis unit and DSP that reads the EGR cooler temperature signals over a predetermined time period or sample points, and generates a symmetric signal. A discrete fast Fourier transform is applied to the symmetric signal to develop values for the spectral magnitude and phase angle of a primary frequency component of the signal. These values can be compared to respective predetermined threshold values to determine whether a fault condition has occurred in the EGR system or EGR cooler. In an alternative embodiment, the DSP operates in the time domain to determine a signal power value for the change in cooler temperature signal over a predetermined time period. This signal power value can be compared against one or more threshold values to determine the health of the EGR system and cooler. In a further alternative embodiment, a temperature difference between the coolant temperature measured by the EGR cooler temperature sensor when the EGR valve is opened is compared to a baseline EGR cooler temperature value. Over successive cycles, this temperature difference is compared to various threshold values indicative of an EGR fault, an EGR cooler fault or a cooler failure.

19 Claims, 3 Drawing Sheets

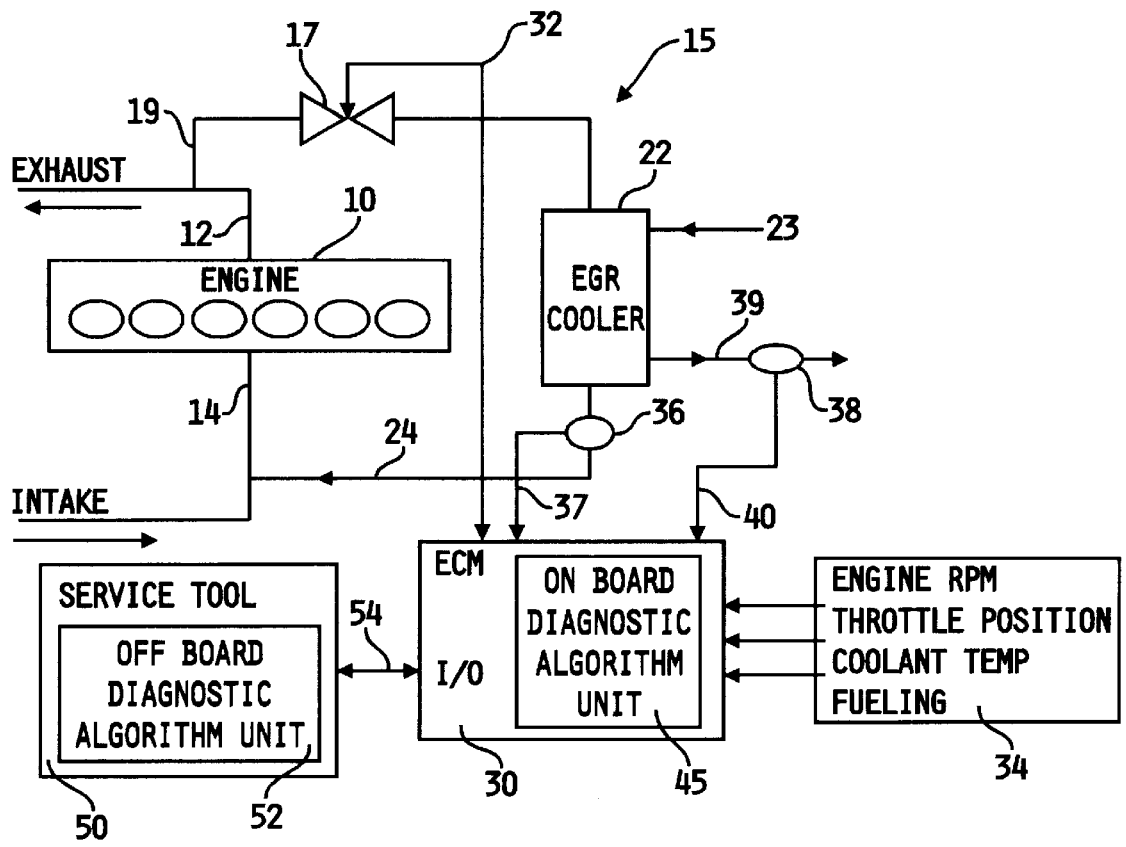
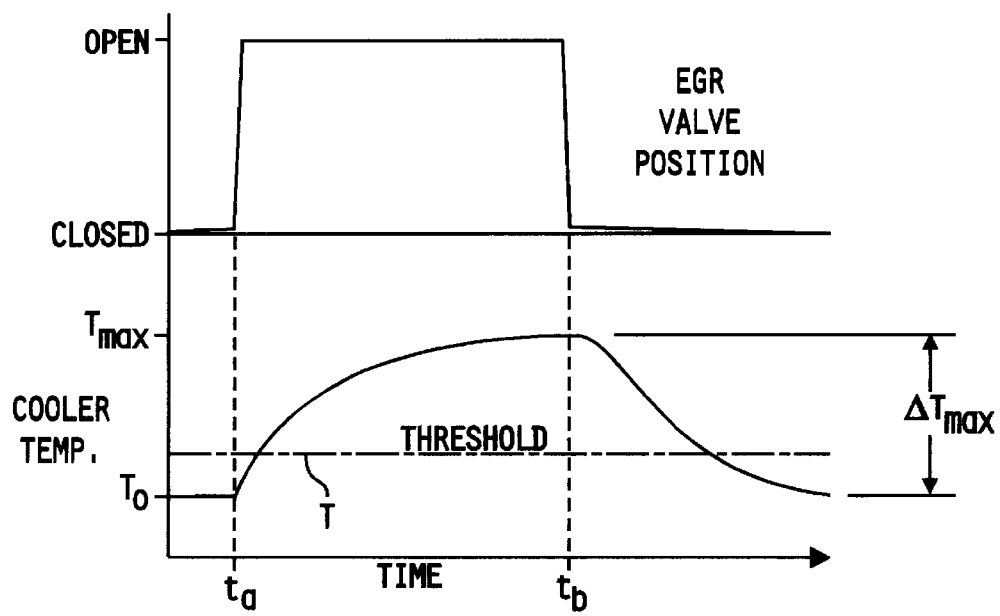

EGR FAULT DIAGNOSTIC SYSTEM

BACKGROUND OF THE INVENTION

The present invention relates to an exhaust gas re-circulation system for an internal combustion engine. More particularly, the invention concerns a system and method for diagnosing malfunctions, faults or failures of the EGR system.

In order to meet various state and federal emissions control requirements, many internal combustion engines are equipped with a system that re-circulates a portion of the combustion gas exhausted from each cylinder of the engine. Such a system, known as the exhaustion gas re-circulation (EGR) system, includes an EGR valve that is interposed between the engine exhaust and its intake manifold. Typically, the EGR valve is a variable position valve that can be opened to a varying degree to control the amount of exhaust gas re-circulated into the engine air intake manifold. The EGR system reduces emission of oxides of nitrogen by decreasing the level of oxygen in the engine combustion process, and by reducing the capacity of the engine intake air charge to absorb heat. A lower combustion temperature frustrates NOx production.

The EGR valve must necessarily operate in a very harsh environment characterized by temperature extremes, vibration, and various gaseous and particulate contaminants. Likewise, other components of the EGR system, such as the intake and exhaust conduits, must also remain "healthy" to maintain the integrity of the EGR system.

One common source of EGR malfunction is caused by the deposit or accumulation of carbon in the valve and/or gas flow passageways. These carbon deposits can restrict the movement of the EGR valve itself, as well as restrict the flow area through the EGR passageways. Due to the nature of the EGR system, its failure or malfunction may not be readily noticed by the vehicle operator. Instead, the EGR system problems require some form of interactive diagnostic system and method.

In one known method, the temperature of the re-circulated exhaust gas is detected by a temperature sensor arranged downstream of the EGR valve. This approach relies on the theory that the temperature detected by the sensor will differ greatly between when the EGR system is operating normally and when no or very little exhaust gas flows through the system due to an abnormality. Typically, with this type of approach, the EGR system is determined to be defective when the temperature of the re-circulated exhaust gas, as detected by the temperature sensor, is lower than a predetermined fault discrimination value.

One problem with this approach is that the temperature of the re-circulated exhaust can vary widely in response to various conditions of the air being sucked into the engine. In some cases, the EGR system is thought to be operating abnormally although it is operating properly, and vice versa. Moreover, when the engine is not yet completely warmed up, its operation is unstable and the temperature of the EGR exhaust gas can vary significantly. Under these circumstances, an accurate fault detection of the EGR system can not be made using conventional techniques.

Another problem that can be encountered in an EGR system surrounds the EGR cooler. In many EGR systems, a cooler is interposed between the EGR valve and the engine intake manifold. This cooler reduces the temperature of the exhaust gas before re-introduction into the intake manifold. Cooling the re-circulated exhaust gas minimizes overheating of the air/fuel mixture, reduces fuel evaporation and yields better engine operating efficiency.

Like the EGR valve, the cooler is susceptible to fouling, such as by carbon deposits. In addition, in most cases, the EGR cooler relies upon a coolant flowing through the cooler to reduce the exhaust gas temperature. Another cooler fault can arise if the coolant flow path is disturbed or interrupted. Prior EGR diagnostic approaches are unable to determine whether the EGR cooler is the source of the EGR system fault. In other words, simply evaluating the EGR exhaust gas temperature prior to re-circulation into the intake manifold cannot pinpoint the EGR cooler as a source of the problem.

SUMMARY OF THE INVENTION

In order to address the deficiencies of prior approaches, the present invention contemplates a diagnostic system and method that evaluates a temperature of the EGR cooler, particularly the EGR coolant temperature or the cooler gas outlet temperature. This temperature is evaluated during a test phase in which the EGR valve is initially closed, opened for a predetermined duration, and then closed. During this test phase, the EGR cooler temperature will follow a predictable curve for a properly operating EGR system and cooler.

In a first diagnostic approach, the EGR cooler temperature is compared to a first threshold value. If the temperature exceeds the first threshold, the EGR cooler and system is determined to be operating properly, in that re-circulated gas is freely flowing through the system.

In accordance with a second diagnostic approach of the present invention, a baseline cooler temperature is obtained when the EGR valve is initially closed. After the valve is opened, the difference between the rising EGR cooler temperature and t he baseline temperature is determined and compared to various threshold values. With this approach, anomalies that affect the baseline EGR cooler temperature are eliminated from consideration. In other words, phenomena outside the EGR system and EGR cooler can cause fluctuations in the EGR cooler temperature that are unrelated to the EGR system.

In this embodiment, the temperature difference is compared to a first threshold value to determine if the EGR system is presumptively operating properly. If the cooler temperature increases by the threshold value then it is known that exhaust gas is being recirculated through the EGR system. The temperature difference can be compared to a second threshold that is indicative of a fault condition in the EGR cooler. If the temperature difference falls between the first and second threshold values, the EGR system is healthy and operating properly. However, if the cooler temperature difference exceeds the second threshold value, a cooler fault condition is indicated.

An additional threshold value can be utilized to discriminate the severity of the EGR cooler fault. For instance, in one feature of the invention, a cooler temperature difference that exceeds the second threshold but is below the additional third threshold value can be indicative of a moderate fault condition in which the EGR coolant path is not fully occluded. In this condition, the EGR system can continue to operate and a fault indicator can be activated to direct corrective action when the engine is being serviced. A temperature difference above the third threshold value can suggest an EGR cooler failure, which necessitates shutting down the EGR system to prevent a more severe or catastrophic problem.

In a further embodiment of the inventive system and method, a frequency-based analysis is conducted of the coolant temperature as it changes when the EGR valve is opened. In one aspect of this embodiment, it is known that the coolant temperature will increase during the time that the EGR valve is opened as the hot exhaust gas passes through the EGR cooler. This temperature increase defines an increasing curve.

With this embodiment, a periodic signal is developed from this increasing temperature curve, preferably by generating a mirror image of the temperature curve. This resultant periodic signal is subject to a frequency analysis to identify the frequency components of the signal. In a preferred embodiment, a Fourier analysis is performed on the resultant periodic signal to derive the primary frequency component. In a most preferred embodiment, a discrete fast Fourier transformation is conducted to derive the real and imaginary parts of this frequency component.

The real and imaginary parts are then used to calculate the magnitude and phase of the primary frequency component. The magnitude value can then be compared to predetermined threshold values to assess the health of the EGR system and EGR cooler. Likewise, the phase angle of the primary frequency component can be compared to another threshold value(s) to provide a further tool for diagnosing the EGR system and cooler.

It is one object of the present invention to provide a system and method for diagnosing potential faults in an EGR system. A more specific object is accomplished by features of the invention that diagnose faults in the EGR cooler.

One benefit of the invention is that it can provide a more accurate and timely diagnosis of the EGR system than prior approaches. A further benefit is achieved by the embodiment utilizing a frequency domain analysis, namely the ability to isolate the EGR system or EGR cooler performance from spurious noise or external factors.

DESCRIPTION OF THE FIGURES

FIG. 1 is a schematic depiction of an engine with an exhaust gas re-circulation system, along with diagnostic components of an EGR fault diagnostic system according to one embodiment of the present invention.

FIG. 2 is a graph showing the relationship between EGR valve position and a temperature at an EGR cooler.

DESCRIPTION OF THE PREFERRED EMBODIMENTS

Figure 3:
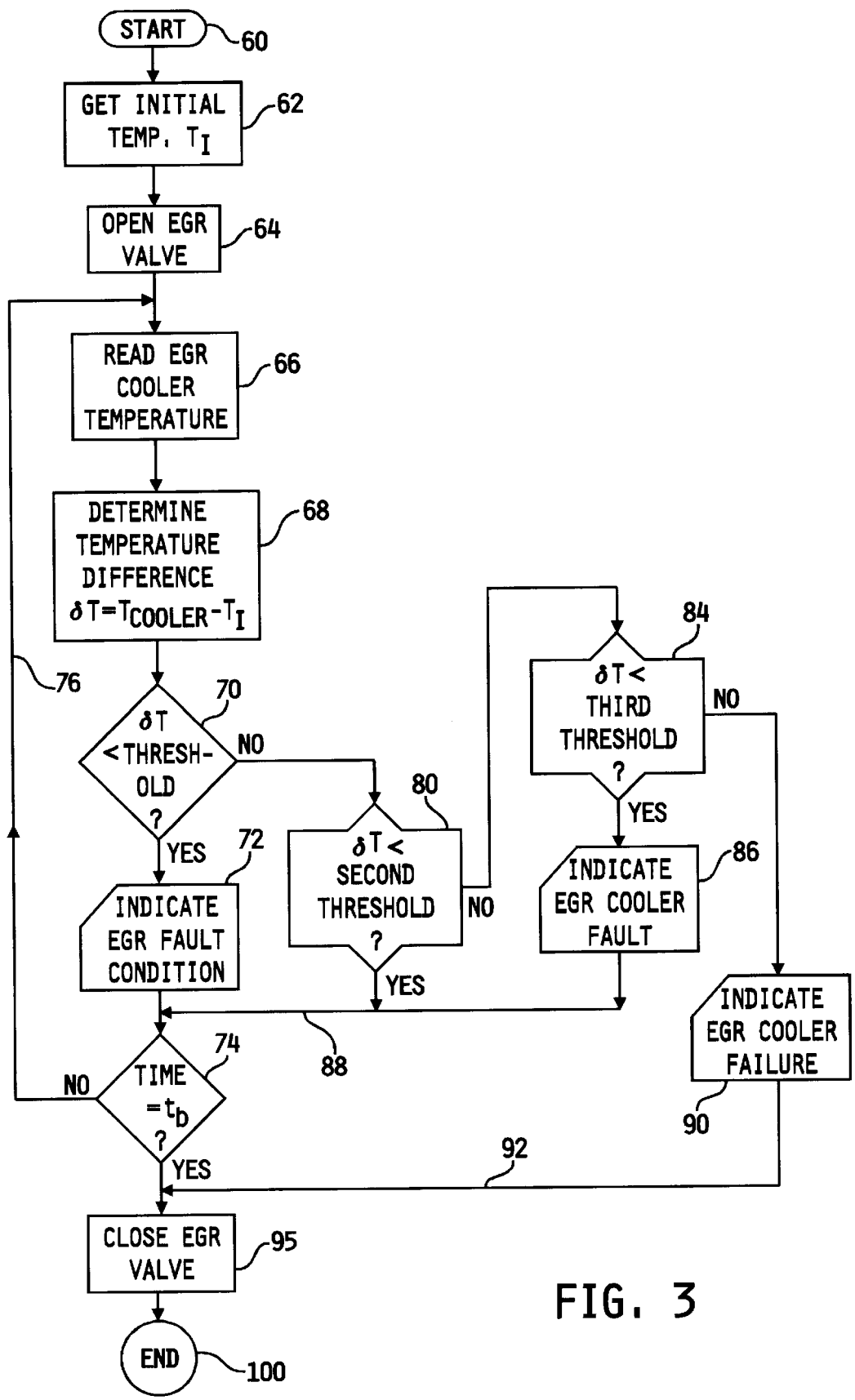
FIG. 3 is a flowchart of a method for diagnosis of an EGR fault condition according to one embodiment of the invention.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, an engine 10 includes an exhaust manifold 12 and an intake manifold 14. An exhaust gas re-circulation system 15 can be interposed between the exhaust 12 and the fresh air intake 14. The EGR system further includes an EGR valve 17 that communicates with the exhaust manifold 12 by way of an intake passageway 19. The EGR valve 17 is operable to control the flow of gas being exhausted by cylinders of the engine. In some embodiments, the EGR valve can be a simple on-off valve, while in more prevalent designs, the valve 17 is a variable position valve that can be modulated between a fully opened and a fully closed position.

In the illustrated embodiment, exhaust gas from the engine 10 flows through passageway 19 and EGR valve 17 to an EGR cooler 22. The EGR cooler operates to cool the exhaust gas within the EGR system 15 for reentry through exhaust passageway 24 into the fresh air intake manifold 14 of the engine 10. It has been found that cooling the exhaust gas being re-circulated reduces over heating of the air/fuel mixture flowing into the engine, reduces fuel evaporation and yields better engine operating efficiency. In one type of EGR cooler 22, the gas flowing through the EGR system 15 passes over a radiator-type construction in which a cooling fluid or coolant, such as water, flows through the radiator element. In the illustrated embodiment, coolant enters the EGR cooler 22 at inlet 23 and exits at outlet 39.

In accordance with the preferred embodiment of the invention, the engine 10 is controlled by an on-board electronic control module 30 (ECM). The ECM 30 can provide control signals to the engine operating components to control various aspects of engine performance. As it pertains most particularly to the present invention, the ECM 30 provides control signals along signal path 32 to the EGR valve 17. Algorithms within the ECM 30 receive signals from various engine and condition sensors 34. These sensors can provide signals indicative of engine coolant temperature, oil pressure, intake manifold pressure, ambient pressure, and the like. These algorithms then determine when and to what degree the EGR valve 17 is opened to re-circulate exhaust gas emitted by the engine 10.

In accordance with the present invention, a system and method is provided for diagnosing malfunctions, faults or failures of the EGR system 15. To that end, the ECM 30 includes an onboard diagnostic algorithm unit 45, which is preferably a software based module that evaluates input data and determines when an EGR fault has occurred. A service tool 50 can be provided that can be in communication with the ECM 30. The service tool 50 can include its own off-board diagnostic algorithm unit 52, which can download sensor data along communication link 54 from the ECM 30. Thus, in accordance with the present invention, the diagnostic methods can be conducted within the ECM diagnostic unit 45, or externally by way of the service tool 50.

According to certain features of the present invention, the EGR system diagnosis can be based upon temperature readings from the EGR cooler 22. In one embodiment, a gas temperature sensor 36 is interposed between the cooler 22 and the air intake manifold 14, most particularly within the exhaust passageway 24. Signals from this temperature sensor 36 can be provided to the ECM 30 along signal line 37. Alternatively, sensor 36 can be situated at the intake manifold 14 after the EGR mixing point, or downstream of the intersection of the exhaust passageway 24 with the manifold 14.

In a further embodiment, a fluid temperature sensor 38 is disposed in the coolant outlet line 39. Signals from this sensor pass along signal line 40 to the ECM 30. The sensor 38 provides signals indicative of the temperature of the coolant itself, rather than of the gas that is exiting the EGR cooler along exhaust passageway 24.

With either of the embodiments, the focus of the diagnostics routine is on a temperature signal at the EGR cooler 22, rather than at the intake passageway 19, EGR valve 17 or intake manifold 14. The temperature signal generated by gas temperature sensor 36 or coolant temperature sensor 38 bears a particular relationship to the EGR valve position. Thus, as depicted in FIG. 2, the EGR valve 17 is moved from a closed position to an open position at time $t_a$. The EGR valve is maintained open for a period of time, and then closed again at time $t_b$. The measured EGR cooler exit temperature, whether the exhaust gas or the coolant, starts at initial temperature $T_0$ and increases to a maximum temperature $T_{max}$. During normal operation, and for as long as the EGR valve is maintained in its open position, the cooler temperature will remain at the steady state temperature $T_{max}$. Once the EGR valve is closed, the temperature rapidly decreases to the initial temperature $T_0$.

The present invention contemplates several levels of diagnosis of problems within the EGR system 15. At a first level of diagnosis, the increasing cooler temperature value is compared against a threshold temperature $T_{th}$. This threshold temperature is represented by the horizontal line in FIG. 2. The EGR system 15 can be determined to be operating if the cooler temperature exceeds the value $T_{th}$ during the time that the EGR valve is in its open position. In this respect, the diagnosis is not quantitative in nature. In other words, this approach can only determine whether the EGR system 15 is functioning, and is not capable of determining whether the system is functioning properly. Using this first level diagnostic approach would simply clear the EGR system 15 as functioning to some degree. Of course, this initial threshold value $T_{th}$ can be set at a high enough temperature to provide a greater degree of certainty that the EGR system and cooler are functioning properly.

However, this approach cannot readily differentiate between EGR cooler temperature increases that are due to the function of the EGR valve itself, rather than due to external stimuli or circumstances. For example, the EGR cooler temperature may not return to its baseline temperature $T_0$ once the EGR valve is closed, due to some failure of the EGR system 15 or other circumstance.

In order to address this problem, a second approach is contemplated by the present invention, as reflected in the flowchart of FIG. 3. This approach includes evaluating the difference in temperature between the baseline cooler temperature when the EGR valve is closed, namely $T_0$, and the increasing cooler temperature after the EGR valve is opened. This increasing temperature differential, denoted $\delta T$ in the flowchart of FIG. 3, will vary from zero to the value $\Delta T_{max}$ corresponding to the maximum steady state cooler temperature.

The differential $\delta T$ can be compared to its own set of comparable thresholds. A first threshold value can be established to indicate that the EGR system is operating. This first threshold is similar to the absolute temperature threshold $T_{th}$ described above, in that this temperature does not pinpoint any other source or problem that can cause the cooler temperature sensed at either sensor 36 or sensor 38 to exceed the first threshold value.

For the EGR system 15 of the illustrated embodiment, the EGR cooler 22 is provided to maintain an optimum steady state exhaust gas temperature. If the EGR cooler fails or becomes fouled, the exhaust gas temperature will increase higher than expected, although the EGR system 15 may be generally operating properly. Thus, second threshold can be provided that is preferably at or above the anticipated maximum temperature difference, $\Delta T_{max}$, for a properly functioning EGR cooler. When the cooler gas outlet temperature is used, if the temperature differential $\delta T$ exceeds the second threshold value, an EGR cooler fault can be identified.

The on-board diagnostic unit 45 within the ECM 30 can implement a series of software instructions to perform this EGR diagnosis. The flow chart of FIG. 3 depicts the sequential steps of one embodiment of a software routine that can be implemented by the diagnostic unit 45. The starting step 60 can be initiated by the ECM 30. The routine can commence with the engine is first started, and preferably after the engine has reached a steady state temperature. Alternatively, the ECM 30 can direct the on-board diagnostic unit 45 to begin the routine at various times during the vehicle operation.

Once the routine is started, the first step is to obtain the initial temperature, $T_I$, of the EGR cooler 22. This temperature can be either the exhaust gas temperature as determined by sensor 36, or the coolant outlet temperature, as determined by the sensor 38. In the preferred embodiment, the gas outlet temperature is utilized. In this approach, the increasing cooler temperature is compared to the initial temperature $T_I$ obtained prior to opening the EGR valve. This initial temperature may or may not be the anticipated steady state baseline cooler temperature. Regardless of the initial temperature, the temperature differential can be calculated continuously as signals are received on line 37 from the corresponding sensor 36.

Once the initial gas temperature is determined, the EGR valve is opened in step 64. As shown in FIG. 2, once the EGR valve is fully opened, the cooler temperature will increase. Preferably, signals from the corresponding sensor, such as the sensor 36 along signal line 37, are continuously received by the ECM 30, so that the EGR cooler temperature $T_{cooler}$ is read continuously in step 66. In next step 68, the temperature difference value $\delta T$ is determined from the difference between the current and baseline cooler temperatures ($T_{cooler} - T_I$). It is this temperature difference $\delta T$ that is compared with various thresholds to diagnosis a fault condition in the EGR system 15 and cooler 22.

In first test at conditional step 70, the $\delta T$ value is compared with an initial threshold value. As previously described, this initial threshold value can correspond to a temperature increase that is anticipated in the EGR cooler 22 if the EGR system 15 is functioning—i.e., when exhaust gas is being recycled through the EGR valve and EGR cooler. If the $\delta T$ value never exceeds that threshold, control passes to output step 72 in which an EGR fault condition is indicated. This fault condition only provides an indication that the EGR system is not functioning properly, without pinpointing the source or severity of the problem.

This fault indication can be by an annunciator light or similar display. In one preferred embodiment, the fault condition indicator can be activated over each loop of the routine of FIG. 3 so long as the temperature difference value $\delta T$ is below the initial temperature threshold value. Preferably, however, the EGR fault indication is withheld for a predetermined time period, such as until the time that the EGR valve is open reaches the time tb (see FIG. 2).

Once the EGR fault condition is indicated in step 72, control passes to conditional step 74. In this step, in one embodiment a determination is made as to whether the EGR value open time has elapsed. As shown in FIG. 2, the EGR valve is open between a time $t_a$ and a time $t_b$. In one specific embodiment, the time value tb can be predetermined—i.e., the EGR valve will remain open for a fixed period of time. In this case, the conditional step 74 compares the current time with the time value $t_b$. If the time has not expired, control passes on loop 76 back to the step 66 in which the current EGR cooler temperature is read by the ECM 30.

Alternatively, the conditional step 74 can determine whether the cooler temperature has reached a steady state value. This determination can be made by comparing the current cooler temperature with a temperature value measured at a prior loop through the sequence of steps. If the time for the EGR valve to be opened has expired, control passes to step 95 in which the EGR valve is closed and the routine has ended at step 100.

Returning to the conditional step 70, if the δT value exceeds the initial threshold, the EGR system has at least passed its first diagnostic test, meaning that the EGR system 15 is presently operating. Control then passes to a second conditional in step 80 in which the value δT is compared to a second threshold value. Again, as previously described, the second threshold value is intended to determine whether the EGR cooler 22 is operating too hot. If the δT value is below the second threshold, both the EGR system 15 and the EGR cooler 22 is determined to be operating properly. A "yes" answer to the conditional step 80 then returns control at loop 88 to the conditional step 74. Again, as described above, if the EGR valve opening time has not expired the routine will continue to loop and the EGR cooler temperature $T_{cooler}$ will be continuously evaluated against the conditional step 70 and conditional step 80. So long as the δT value falls between the first and second thresholds, no fault condition will be indicated for either the EGR system or the EGR cooler.

On the other hand, if the conditional step 80 fails, or a "no" answer is generated, some EGR cooler fault has been identified. In one embodiment of the invention, the severity of this fault can be assessed when control passes to still another conditional step 84. In this conditional step, the δT value is compared against a third threshold which is indicative of an EGR cooler failure. If the δT value is less than the third threshold, the conditional of step 84 is answered in the affirmative. Since the temperature difference falls between the second and third thresholds, an EGR cooler fault is indicated, as in step 86. This fault condition may be an indication that the fouling of the cooler if present but still functioning. Under these circumstances, the EGR system 15 may continue to operate, and the ECM will alter operating control conditions so as to minimize emissions against cooler fouling.

If the δT value falls within the second and third thresholds, and once the EGR cooler fault is indicated in step 86, control passes on loop 88 again to the conditional step 74 so that the routine can continue to loop. In the preferred embodiment, the routine continues for the time period that the EGR valve is open even if an EGR fault condition is indicated in step 72 or an EGR cooler fault condition is indicated in step 86. Continuing the loop 76 in the routine shown in FIG. 3 reduces the likelihood of generating "false negatives", namely generating a fault indication at one time that is not repeated at a later time. If either of the fault values remains after the EGR valve is closed in step 95 and the routine is ended in step 100, the fault indication can be retained by the ECM 30, and particularly the on-board diagnostic unit 45. In many vehicles, a fault flash-out sequence is implemented on engine start up, engine power down, or during routine maintenance. The flash out of various fault annunciators will reveal the fault condition, if it exists, as determined by the routine of FIG. 3.

Looking back at conditional step 84, if the temperature difference δT exceeds the third threshold value, the conditional is answered in the negative, meaning that the EGR cooler has likely experienced a significant failure. A significant failure will prevent the EGR cooler from reducing the re-circulated exhaust gas temperature by any appreciable amount. Thus, while exhaust gas is flowing through the cooler 22 (as determined in conditional step 70), less heat than required is being removed by the cooler. This significant failure can be attributed to a failure of the coolant supply or discharge, or to severe fouling of the gas pasages.

Under this circumstance, an EGR cooler failure is indicated in step 90 and control passes along line 92 to step 95. In this step, the EGR valve is closed immediately, even though the routine may not have run through its entire time sequence. In the instance when the EGR cooler fails, it is believed more prudent to shut down the EGR system 15 to avoid a more serious problem with either the EGR system or the cooler 22, or to prevent non-cooled exhaust gas from being reintroduced into the engine intake manifold. The EGR cooler failure indicator can be retained by the ECM and on-board diagnostic unit 45. Moreover, the cooler failure indicated can be used to prevent activation of the EGR system 15 during subsequent engine operation until the failure indication is cleared during a maintenance procedure.

The protocol of the flowchart in FIG. 3 is implemented in one embodiment of the invention to provide a more informative diagnosis of the EGR system than prior techniques. With this invention, faults in the EGR cooler can be identified, as well as the severity of those faults. With this embodiment, each of the threshold temperature difference values can be predetermined based upon expected normal EGR system and EGR cooler operation. Likewise, the time duration $t_b$ can be predetermined. Each of these values can be stored in a memory within the ECM 30 for use by the on-board diagnostic algorithm unit 45. Preferably, the flowchart of FIG. 3 is embodied in a series of software instructions implemented by the algorithm unit 45.

In a further embodiment of the invention, the on-board diagnostic unit 45 includes a digital signal processor (DSP). This signal processor receives temperature signals on signal line 37 for the exhaust gas temperature sensor 36 or on signal line 40 for the coolant temperature sensor 38. The sensors 36, 38 can generate a digital signal that is provided directed to the DSP component of the unit 45. Alternatively, the sensors 36, 38 can produce analog signals and the ECM can include an analog/digital converter to generate a digital signal to be provided to the DSP component.

In one embodiment, the DSP provides an estimation of signal power in the time domain. The signal power can be given by the relationship:

$$T_p = \sum_{i=t_a}^{t_b} [T_{cooler}(i) - T_I]^2$$

In other words, the time domain signal power $T_p$ is the sum of the squares of the temperature difference, δT, over the time period in which the EGR valve is opened. This approach using the DSP presents a modification to the flow chart of FIG. 3. Rather than evaluate the temperature difference at each loop of the process, a temperature difference value is calculated at each time, namely δT (i), where i represents a time data point between the times $t_a$ and $t_b$. In this embodiment, the flow chart of FIG. 3 can be modified with the conditional steps 70, 80 and 84, along with the fault indication steps 72, 86 and 90, being executed after the conditional step 74. Once the predetermined time period has elapsed, control passes from step 74 to an additional step in which the DSP determines the signal power value $T_p$ using the above equation. Alternatively, the DSP can be producing this value continuously as the EGR cooler temperature is read at each time increment. Once this value is determined, it can be compared against various calibratable diagnostic thresholds. For example, if the signal power value $T_p$ is greater than a certain predetermined threshold, the EGR system 15 and cooler 22 are presumed to be functioning properly.

Since this embodiment utilizes digital signal analysis in the time domain, the sampled signals are collected during the EGR valve open time, namely the time between $t_a$ and $t_b$. This approach differs from the first embodiment that evaluated the temperature difference δT at each cycle through the algorithm. In addition, using the time domain analysis permits usage of a greater number of signal samples. Finally, the digital signal analysis results in a more robust output value ($T_p$) for comparison to a predetermined threshold value. For example, using the first mentioned approach, an expected value for $\Delta T_{max}$ may not exceed 1.5–2.0 degrees. On the other hand, for a comparable EGR system, the time domain value $T_p$ can approach 40. The greater magnitude provides a wider range for evaluating the signal power relative to one or more predetermined threshold values.

Figure 4:
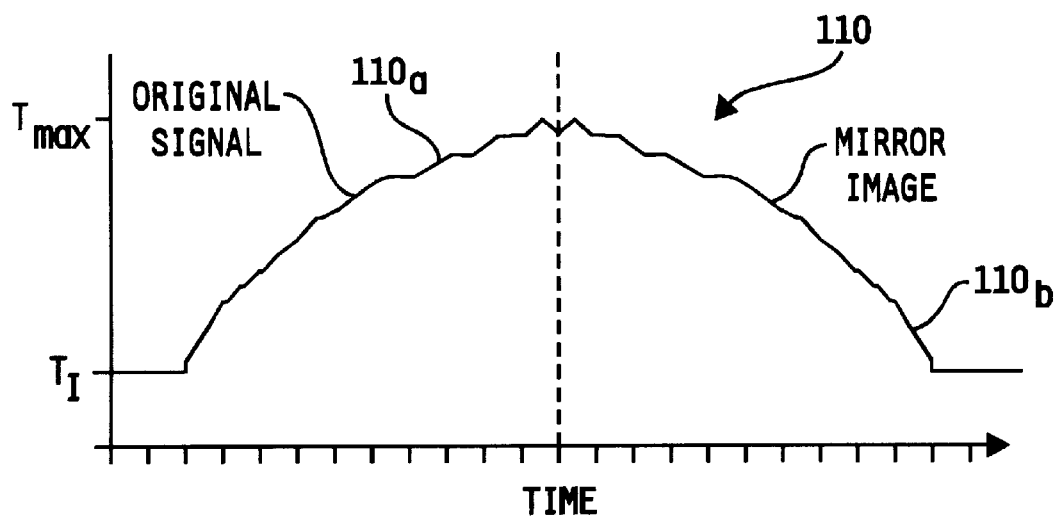
FIG. 4 is a graph showing a resultant symmetric signal, generated from an original signal of a temperature at the EGR cooler.

In a further alternative embodiment using the DSP, a frequency domain analysis of the cooler temperature signal is conducted. The array of cooler temperature values obtained at successive time increments can be plotted on a graph as shown in FIG. 4. As the graph reflects, the original temperature signal 110a increases from an initial value $T_I$ to a maximum value, $T_{max}$. Of course, this curve 110a is made up of a plurality of discrete temperature values at each of the time increments. In order to conduct a frequency domain analysis, a symmetric signal 110 is generated by combining the original signal 110a with its mirror image 110b, as illustrated in FIG. 4.

Figure 5:
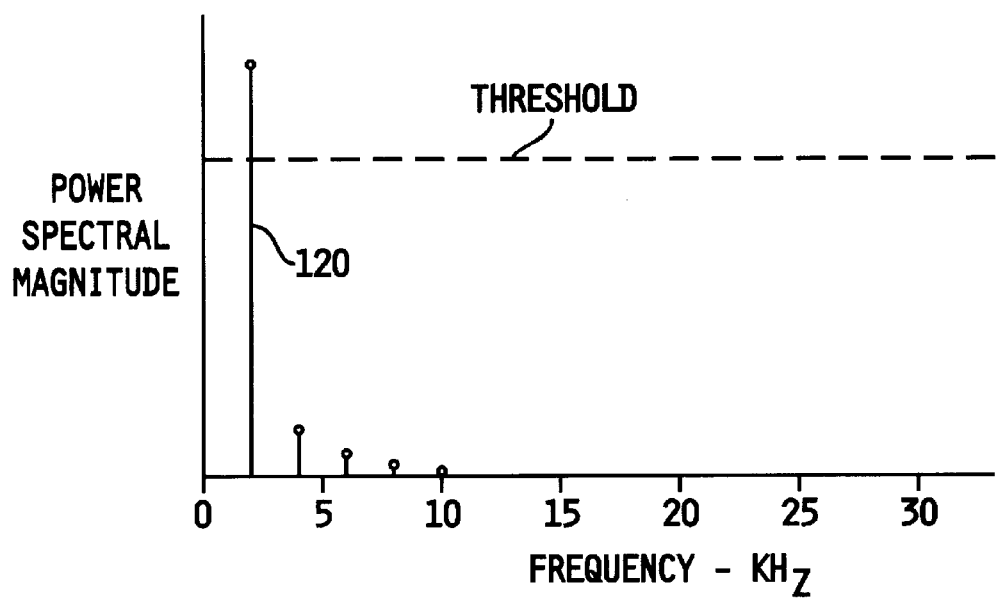
FIG. 5 is a graph of the power spectral magnitude of various frequency components of the resultant symmetric signal shown in FIG. 4 when subject to a diagnosis method according to one embodiment of the present invention.

This symmetric signal 110 can then be evaluated using a discrete fast Fourier transformation (DFFT), which is preferably applied to coolant outlet temperature. One object of performing the DFFT on the symmetric signal shown in FIG. 4 is to break the signal down into its discrete frequency components. As is known with Fourier analysis, any signal can be described by a combination of periodic functions at a purality of frequencies. Using Fourier analysis techniques, the principal frequency components of a signal can be derived. Thus, shown in FIG. 5, a graph of signal magnitude, or power spectral magnitude, for each frequency can be ascertained using the DFFT. The frequency having the highest magnitude as shown in FIG. 5 is the primary frequency of the temperature signal. The remaining frequencies can be symptomatic of noise or other environmental conditions imposed on the cooler temperature signal.

In the preferred embodiment, the DFFT develops values for the magnitude and phase of the transformation at the principal or first fundamental frequency of the symmetric signal 110 shown in FIG. 4. As is known in Fourier analysis, the magnitude and phase of the fundamental frequency signal is a function of the real and imaginary components of the DFFT. These components can be given by the following equations for the first fundamental frequency:

$$\text{MAGNITUDE} = \sqrt{Re^2 + Im^2}$$

$$\text{PHASE ANGLE} = \arctan\left(\frac{Im}{Re}\right),$$

$$\text{where } Re = \sum_{n=0}^{N-1} \{T_{cooler}(n) * (x_{n+1} + x_n)\}, \text{ and}$$

$$Im = \sum_{n=0}^{N-1} \{T_{cooler}(n) * (y_{n+1} - y_n)\}.$$

The discrete summations occur over all N temperature samples, rather than over a predetermined time period. However, for a predetermined sampling rate, the number of samples can be calibrated to be equivalent to the time period tb–ta used in the time domain analysis.

The variables x and y are Fourier expressions that have initial values $x_0=1$ and $y_0=0$. The variables x and y for successive samples are given by the following matrix equation:

$$\begin{bmatrix} x_{n+1} \\ y_{n+1} \end{bmatrix} = \begin{bmatrix} \cos(2\pi/N) & \sin(2\pi/N) \\ -\sin(2\pi/N) & \cos(2\pi/N) \end{bmatrix} \begin{bmatrix} x_n \\ y_n \end{bmatrix}$$

The power spectral magnitude for the principal frequency component is the square root of the sum of the squares of the real and imaginary components. The phase of this fundamental frequency component is the arctangent of the imaginary component divided by the real component. The graph of FIG. 5 represents a plot of the magnitude value for the frequency components of the symmetric signal 110 shown in FIG. 4. The first frequency component 120 includes the bulk of the energy for the symmetric cooler temperature signal 110. The remaining frequency components have considerably smaller magnitude than the primary component and are most likely a result of noise and external or environmental factors.

In accordance with this embodiment, the power spectral magnitude for the primary frequency component 120 can be compared against a calibratable threshold to determine whether the EGR system 15 and EGR cooler 22 is functioning properly. A value for MAGNITUDE that is less than the threshold can indicate a fault condition in the EGR system or EGR cooler. As a further refinement, the phase angle of the signal can also be compared against a predetermined range of angles. In a specific instance, the value for PHASE ANGLE must fall within the range of −180° to −150°. If either of the these values for the fundamental frequency component falls outside of the corresponding threshold, the EGR system and cooler is determined to have a problem. Otherwise, if both values fall within their predetermined ranges, the EGR system and cooler are diagnosed as functioning properly and the system continues to operate in its normal fashion. A fault annunciator, such as described above, can be energized by the diagnostic algorithm unit 45 depending upon the outcome of this DFFT analysis for the generated symmetric signal 110.

As a further diagnostic technique, the invention contemplates running a series of baseline tests for a new engine. These baseline tests will generate initial magnitude and phase values for the first fundamental frequency of the symmetric temperature signal. This value can be stored in memory, along with the spectral magnitude and phase angle values generated during subsequent diagnostic tests. Thus, even if a fault condition is not indicated during a particular test, the engine technician can download the signal history to determine if a problem is developing in the EGR system or EGR cooler.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A method for determining a fault condition in an exhaust gas recirculation (EGR) system having an EGR valve operable to control the re-circulation of exhaust gas and an EGR cooler operable to reduce the temperature of the re-circulated gas, comprising:
    opening the EGR valve;
    sensing a temperature of the EGR cooler while the EGR valve is open to generate a temperature signal;
    generating a symmetric signal from the temperature signal;
    performing a frequency analysis on the symmetric signal to isolate the frequency components of the signal;
    evaluating the magnitude of the primary frequency component; and
    indicating a fault condition in the EGR system if the magnitude is outside a diagnostic threshold.

2. The method for determining an EGR fault condition according to claim 1, wherein said step of generating a symmetric signal includes combining the temperature signal with a mirror image of the temperature signal to produce the symmetric signal.

3. The method for determining an EGR fault condition according to claim 1, wherein said step of performing a frequency analysis includes performing a discrete Fourier transform of the signal.

4. The method for determining an EGR fault condition according to claim 3, wherein the step of determining the magnitude of the primary frequency component includes:
    determining the power spectral density of the signal; and
    obtaining the magnitude of the power spectral density for the primary frequency component.

5. The method for determining an EGR fault condition according to claim 1, wherein the step of sensing the temperature includes sensing the temperature of the coolant or recirculated gas at an outlet of the EGR cooler.

6. The method for determining an EGR fault condition according to claim 1, wherein the step of sensing the temperature includes sampling the coolant temperature at discrete intervals such that the temperature signal is formed of a plurality of such samples.

7. The method for determining an EGR fault condition according to claim 6, further comprising the step of closing the EGR valve after a predetermined number of samples have been obtained.

8. The method for determining an EGR fault condition according to claim 1, further comprising the step of closing the EGR valve after a predetermined period of time.

9. The method for determining an EGR fault condition according to claim 1, wherein the step of performing a frequency analysis on the symmetric signal includes calculating the real and imaginary parts of the primary frequency component of the symmetric signal and calculating the magnitude of the primary frequency component from the real and imaginary parts.

10. A method for determining a fault condition in an exhaust gas recirculation (EGR) system having an EGR valve operable to control the re-circulation of exhaust gas and an EGR cooler operable to reduce the temperature of the re-circulated gas, comprising the steps of:
    generating a temperature signal corresponding to a rise in EGR cooler temperature from an initial condition to a peak value;
    generating a symmetric signal from the temperature signal and its mirror image;
    isolating the primary frequency component of the symmetric signal;
    comparing a magnitude of the primary frequency component to a threshold value; and
    indicating a fault condition if the magnitude is outside the threshold value.

11. A system for determining a fault condition in an exhaust gas recirculation (EGR) system having an EGR valve operable to control the re-circulation of exhaust gas and an EGR cooler operable to reduce the temperature of the re-circulated gas, comprising:
    a temperature sensor for producing temperature signals indicative of a temperature of the EGR cooler of the EGR system;
    means for generating a symmetric signal from said temperature signals;
    a signal processor operable on said symmetric signal to isolate the magnitude of a primary frequency component of said signal; and
    means for indicating a fault condition in response to a comparison of said magnitude to a predetermined threshold value.

12. The system for determining a fault condition in an EGR system according to claim 11, wherein said temperature sensor is a fluid temperature sensor disposed in the coolant outlet for the EGR cooler and operable to measure the temperature of coolant discharged from the EGR cooler.

13. The system for determining a fault condition in an EGR system according to claim 11, wherein said signal processor includes means for performing a Fourier transform on said symmetric signal.

14. A method for determining a fault condition in an exhaust gas recirculation (EGR) system having an EGR valve operable to control the re-circulation of exhaust gas and an EGR cooler operable to reduce the temperature of the re-circulated gas, comprising the steps of:
    sensing an initial temperature $T_I$ of the EGR cooler;
    then opening the EGR valve;
    sensing a current temperature of the EGR cooler when the EGR valve is open at a plurality of sample times;
    determining a plurality of temperature difference values $\delta T$ between the current temperature at each of the sample times and the initial temperature;
    summing the plurality of temperature difference values $\delta T$; and
    indicating a fault condition if the sum falls outside a predetermined threshold value.

15. The method for determining a fault condition in an EGR system according to claim 14, wherein the step of summing includes summing the squares of each of the plurality of temperature difference values $\delta T$.

16. The method for determining a fault condition in an EGR system according to claim 14, wherein the step of indicating a fault condition includes:

comparing the sum to a first threshold value indicative of a functioning EGR system;

indicating an EGR system fault if the sum is below the first threshold value;

otherwise, comparing the sum to a second threshold value indicative of a functioning EGR cooler; and indicating an EGR cooler fault if the sum is above the second threshold value.

17. A method for determining a fault condition in an exhaust gas recirculation (EGR) system having an EGR valve operable to control the re-circulation of exhaust gas and an EGR cooler operable to reduce the temperature of the re-circulated gas, comprising the steps of:

sensing an initial temperature $T_I$ of the EGR cooler;

then opening the EGR valve;

sensing a current temperature of the EGR cooler when the EGR valve is open;

determining a temperature difference value $\delta T$ between the current temperature and the initial temperature $T_I$;

comparing the temperature difference value $\delta T$ to a first threshold value indicative of a functioning EGR system;

indicating an EGR system fault if the value $\delta T$ is less than the first threshold value;

otherwise, comparing the temperature difference value $\delta T$ to a second threshold value indicative of a properly functioning EGR cooler; and indicating an EGR cooler fault if the value $\delta T$ is greater than the second threshold value.

18. The method for determining a fault condition in an EGR system according to claim 17, further comprising the steps of:

comparing the temperature difference value $\delta T$ to a third threshold value if the value $\delta T$ is greater than the second threshold value;

indicating an EGR cooler fault condition if the value $\delta T$ is less than the third threshold value; and indicating an EGR cooler failure if the value $\delta T$ is greater than the third threshold value.

19. The method for determining a fault condition in an EGR system according to claim 17, further comprising:

repeating at least the steps of sensing the current temperature and determining a temperature difference value for a predetermined time period; and closing the EGR valve after the predetermined time period has expired.

* * * * *

UNITED STATES PATENT AND TRADEMARK OFFICE
CERTIFICATE OF CORRECTION

PATENT NO : 6,085,732
DATED : July 11, 2000
INVENTOR(S) : Yue Yun Wang, Steven W. Majors It is certified that error appears in the above-identified patent and that said Letters Patent are hereby corrected as shown below:

On the title page, after the list of Inventors, insert:

--Assignee: Cummins Engine Company, Inc.,
Columbus, Ind.--

Signed and Sealed this

Seventeenth Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO.   : 6,085,732
DATED        : July 11, 2000
INVENTOR(S)  : Yue Yun Wang et al.

It is certified that error appears in the above-identified patent and that said Letters Patent is hereby corrected as shown below:

<u>Title page,</u>
-- Assignee: Cummins Engine Company, Inc., Columbus, Indiana. --

Signed and Sealed this

Eighteenth Day of September, 2001

*Attest:*

NICHOLAS P. GODICI
*Attesting Officer*  *Acting Director of the United States Patent and Trademark Office*